(12) United States Patent
Lusk et al.

(10) Patent No.: US 9,300,764 B2
(45) Date of Patent: Mar. 29, 2016

(54) HIGH EFFICIENCY BINARY ENCODING

(71) Applicant: Amazon Technologies, Inc., Seattle, WA (US)

(72) Inventors: Andrew J. Lusk, Seattle, WA (US); Todd V. Jonker, Seattle, WA (US); Christopher A. Suver, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/673,639

(22) Filed: Mar. 30, 2015

(65) Prior Publication Data

US 2015/0312379 A1 Oct. 29, 2015

Related U.S. Application Data

(60) Continuation of application No. 14/059,106, filed on Oct. 21, 2013, now Pat. No. 8,996,578, which is a continuation of application No. 13/316,227, filed on Dec. 9, 2011, now Pat. No. 8,566,356, which is a division of application No. 12/980,168, filed on Dec. 28, 2010, now Pat. No. 8,078,640, which is a division of application No. 11/939,461, filed on Nov. 13, 2007, now Pat. No. 7,865,525.

(60) Provisional application No. 60/953,669, filed on Aug. 2, 2007.

(51) Int. Cl.
*G06F 17/30* (2006.01)
*H04L 29/06* (2006.01)

(52) U.S. Cl.
CPC .......... *H04L 69/04* (2013.01); *G06F 17/30371* (2013.01); *G06F 17/30386* (2013.01); *H04L 67/42* (2013.01); *H04L 69/02* (2013.01)

(58) Field of Classification Search
CPC ................................. G06F 17/00; G06F 17/30
USPC .................................................. 707/600–899
See application file for complete search history.

(56) References Cited

U.S. PATENT DOCUMENTS

| | | |
|---|---|---|
| 4,315,310 A | 2/1982 | Bayliss et al. |
| 5,572,670 A | 11/1996 | Puckett |
| 5,586,317 A | 12/1996 | Smith |
| 5,694,578 A | 12/1997 | Upson et al. |
| 5,799,310 A | 8/1998 | Anderson et al. |
| 5,903,899 A | 5/1999 | Steele, Jr. |
| 5,920,878 A | 7/1999 | DeMont |
| 6,243,833 B1 | 6/2001 | Hitchcock et al. |
| 6,438,559 B1 | 8/2002 | White et al. |
| 6,442,663 B1 | 8/2002 | Sun et al. |
| 6,725,235 B1 | 4/2004 | Dyer et al. |

(Continued)

*Primary Examiner* — Isaac M Woo

(74) *Attorney, Agent, or Firm* — Knobbe, Martens, Olson & Bear, LLP

(57) ABSTRACT

A method and a system are provided for encoding and processing digital information. The digital information is encoded according to binary encoding formats corresponding to primitive data types. The primitive data types comprise scalar data types including Boolean, integer, float, decimal, time stamp, string, symbol, binary large object, and character large object data types. The primitive data types also comprise composite data types including structure, list and S-expression data types. The binary-encoded digital information is stored in a message with a predetermined format for transmission. No metadata is included in the message.

24 Claims, 14 Drawing Sheets

(56) References Cited

U.S. PATENT DOCUMENTS

| | | |
|---|---|---|
| 6,922,704 B2 | 7/2005 | Frolich et al. |
| 7,028,312 B1 | 4/2006 | Merrick et al. |
| 7,093,263 B1 | 8/2006 | Sexton et al. |
| 7,120,572 B1 | 10/2006 | Liang |
| 7,251,642 B1 | 7/2007 | Szeto |
| 7,352,490 B1 * | 4/2008 | Tse ............... H04N 1/3871 358/1.9 |
| 7,506,298 B1 | 3/2009 | Ingoldby et al. |
| 7,730,079 B2 | 6/2010 | Meijer et al. |
| 7,865,525 B1 | 1/2011 | Lusk et al. |
| 2003/0079049 A1 | 4/2003 | Sokolov |
| 2003/0200256 A1 | 10/2003 | Hu et al. |
| 2005/0166209 A1 | 7/2005 | Merrick et al. |
| 2006/0268967 A1 | 11/2006 | Drezet |
| 2007/0025351 A1 | 2/2007 | Cohen |
| 2008/0270756 A1 | 10/2008 | Lundvall et al. |

\* cited by examiner

NULL VALUE

SHORT VALUE

LONG VALUE

HIGH EFFICIENCY BINARY ENCODING

CROSS-REFERENCE TO RELATED APPLICATIONS

This application is a continuation of U.S. patent application Ser. No. 14/059,106, entitled HIGH EFFICIENCY BINARY ENCODING, and filed on Oct. 21, 2013, which is a continuation of U.S. patent application Ser. No. 13/316,227, entitled HIGH EFFICIENCY BINARY ENCODING, and filed Dec. 9, 2011, now U.S. Pat. No. 8,566,356, which is a divisional of U.S. patent application Ser. No. 12/980,168, entitled HIGH EFFICIENCY BINARY ENCODING, and filed Dec. 28, 2010, now U.S. Pat. No. 8,078,640, which is a divisional of U.S. patent application Ser. No. 11/939,461, entitled HIGH EFFICIENCY BINARY ENCODING, and filed Nov. 13, 2007, now U.S. Pat. No. 7,865,525, which claims the benefit of U.S. Provisional Application No. 60/953,669, entitled DATA FORMAT FOR PROCESSING INFORMATION, and filed Aug. 2, 2007, the entire disclosures of which are incorporated herein by reference.

BACKGROUND OF THE INVENTION

The ubiquity of computers in business, government, and private homes has resulted in availability of massive amounts of information from network-connected sources, such as data sources accessible through communication networks, such as the Internet. In recent years, computer communication and search tools have become widely available to facilitate the finding and availability of information to users and software applications. Most computer communication and search tools implement a client-server architecture where a user client computer communicates with a remote server computer over a communication network. In order to achieve better system performance and throughput in the client-server architecture, large communication network bandwidths are needed as the number of client and server computers increases.

There are several basic approaches to increasing communication bandwidths, including increasing the rate of data signal transmission over communication medium, increasing the number of communication channels and pathways to transmit data in parallel, using server farms to increase service capacity, and using efficient data compression methods to reduce the number of bits transmitted over the communication medium for a given piece of information. Aside from data transmission, data format also affects communication bandwidth. Data format is a representation of data in a particular format. Data formatting generally takes place at a higher level of abstraction than pure data transmission. Data interpretation and processing is generally applied at the data format abstraction level. For example, whether data received at a server is character data or numerical data depends not merely on the bits received, but rather on the encoding and format of the bits. As such, efficient encoding and format can result in efficient data processing by reducing the need to transform data from one format to another before interpreting the data and processing it.

There are many data formats in use today, many of which depend on the application and type of data. For example, audio data is formatted differently than video data. Similarly, numbers used in financial applications may be formatted differently to avoid round-off errors as compared with numbers used in a telephone directory to represent telephone numbers. In recent years, new data formats have been introduced, such as XML (Extensible Markup Language), that provide flexibility for formatting various types of data. In XML, the user can define any data format that is suitable for the user's application. The simplicity and flexibility of such markup languages, like XML, however, can create certain inefficiencies and disadvantages. For example, XML has a single data type to represent information as character strings. Other types of data must be represented as character strings, which are later processed at a receiving application program to obtain the data. For example, some data, like numerical data, must first be converted by a receiving application program from a character string representation in XML to its intended format before any further processing can be performed. This conversion of data format adds overhead and reduces overall system throughput, while increasing system cost and complexity. Additionally, data formatting languages like XML generally transmit the markup tags that are used to format the data along with the data. The markup tags consume a considerable amount of communication bandwidth, often more than the bandwidth consumed by the data, adding to the communication overhead.

In complex business applications, many software modules are involved, each of which may process the same data at different times for different purposes. For example, in a purchasing application, a front end server may receive orders from a customer, pass the ordering information to a business server, which may evaluate the customer's credit rating, and upon approval, pass the ordering information on to a shipping server where the customer's order is fulfilled. While the data is traversing multiple servers and multiple software modules from a front end to a back end server, the data input initially may be transformed from one format to another repeatedly for use by different software modules. A data format which is usable by multiple software modules in a business application reduces or eliminates the need for format transformations across software modules and servers, and thus increases the overall efficiency of data processing and data communication between servers.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
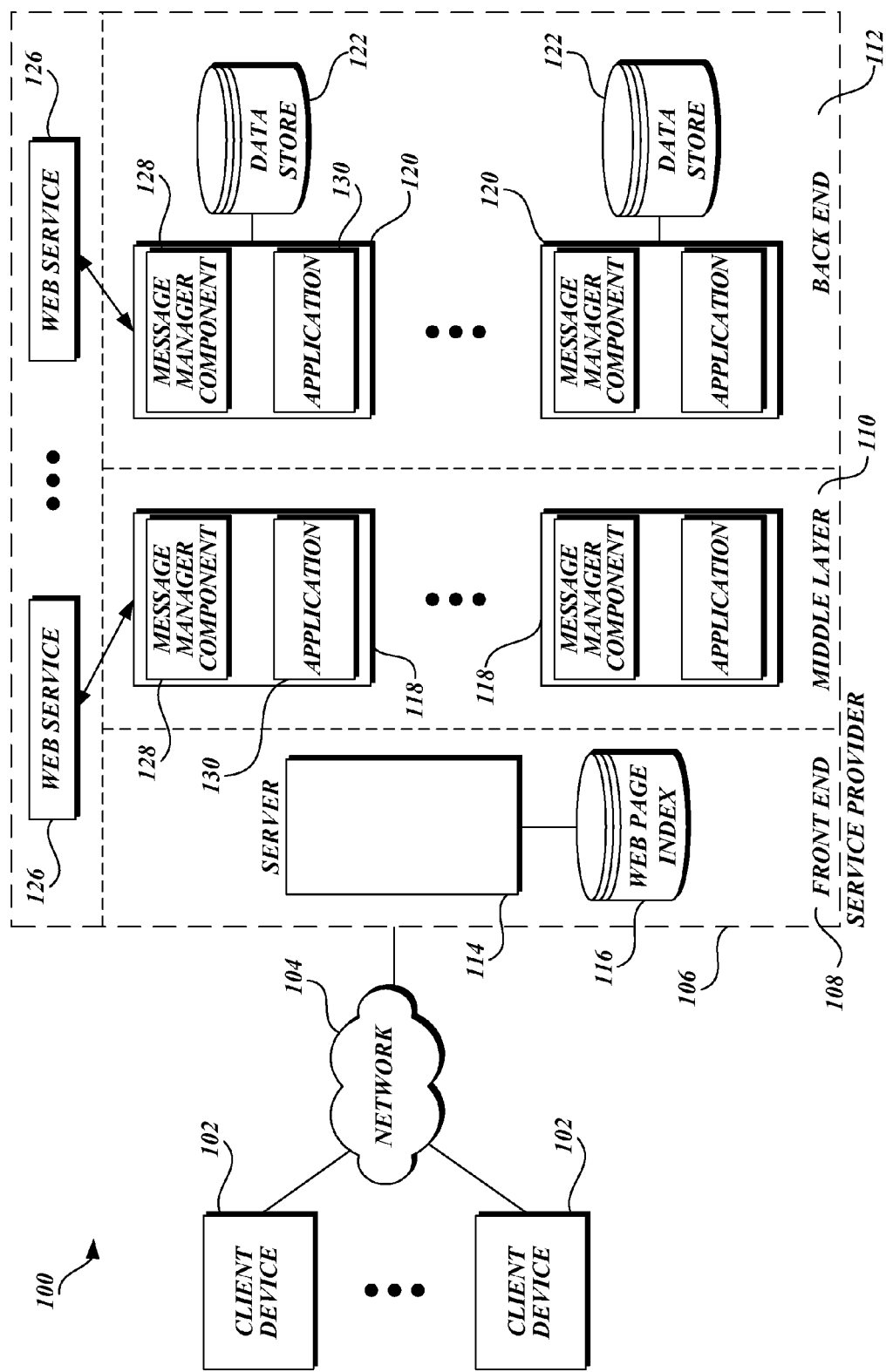
FIG. 1 is a block diagram depicting an illustrative client-server architecture operating environment suitable for using binary-encoded data.

Generally described, the disclosure relates to formatting and encoding data in a computing environment, such as a multi-tier client-server computing environment. Specifically, the disclosure relates to encoding data according to a binary encoding and arranging the encoded data in a composite record having multiple primitive data types. In one illustrative embodiment, a composite record message is created with a message length field, a binary format field, a binary version field, and a number of value fields representing data. The value field may include a type descriptor, a length and a representation field, wherein the representation field represents the actual data. The type description subfield of the value field contains data types included in one of two major categories including scalar types and composite record types. The scalar data types include null, Boolean, integer, float, decimal, time stamp, string, symbol, binary large object (BLOB) and character large object (CLOB) data types. The composite record data types include structure, list and S-expression composite data types, each of which may include other data types. Once data is encoded and formatted according to binary encoding and the primitive data types, the message containing the data is transmitted between servers. At the receiving server, the received message is decoded and interpreted according to the primitive data types and the binary encoding, without the need to convert the message from one format to another.

The following detailed description describes illustrative embodiments of the invention. Although specific operating environments, system configurations and flow diagrams may be illustrated and/or described, it should be understood that the examples provided are not exhaustive and do not limit the invention to the precise forms and embodiments disclosed. Persons skilled in the field of computer programming will recognize that the components and process elements described herein may be interchangeable with other components or elements or combinations of components or elements and still achieve the benefit and advantages of the disclosure herein. Although the present description may refer to the Internet, persons skilled in the art will recognize that other network environments that include local area networks, wide area networks and/or wired or wireless networks, as well as stand-alone computing environments, such as personal computers, may also be suitable. In addition, although the below description describes a client-server architecture, those skilled in the art will recognize that the invention may be implemented in a peer-to-peer network as well.

Prior to discussing the details of the disclosure, it will be appreciated by those skilled in the art that the following description is presented largely in terms of logic operations that may be performed by conventional computer components. These computer components, which may be grouped in a single location or distributed over a wide area, generally include computer processors, memory storage devices, display devices, input devices, etc. In circumstances where the computer components are distributed, the computer components are accessible to each other via communication links.

In the following description, numerous specific details are set forth in order to provide a thorough understanding of the disclosure. However, it will be apparent to one skilled in the art that the disclosure may be practiced without some or all of these specific details. In other instances, well-known process elements have not been described in detail in order not to unnecessarily obscure the disclosure.

FIG. 1 is a block diagram of an operating environment suitable for passing messages having the format and binary encoding described herein. In an illustrative embodiment, the operating environment 100 corresponds to a three-tiered architecture that includes a front end layer 108 for interfacing with client devices 102 generally through a network 104, a middle layer 110 generally used to implement business rules and logic, and a back end layer 112, where most data processing and database interactions take place. The front end layer 108, the middle layer 110 and the back end layer 112 are sometimes referred to as the presentation tier, the logic tier, and the data tier, respectively. Those skilled in the art will appreciate that other system architectures may be used instead of the three-tier architecture without departing from the spirit of the disclosure. For example, in a small business environment, the functions performed by the front end layer 108, the middle layer 110, and the back end layer 112 may be implemented on a single server. The front end layer 108 is generally used to interface and interact with entities outside a service provider 106, such as the client device 102. In one illustrative embodiment, the front end layer 108 may include a Web server 114 coupled with a Web page index 116 that serves Web pages to client devices 102 through the network 104. In another illustrative embodiment, the server 114 may be an application server or a file server in an intranet corporate environment. The middle layer 110 is generally used to implement business logic and processing rules that define the core of services offered by the service provider 106, and may include one or more servers 118, each server having one or more applications 130 running thereon. The servers 118 may also have a software message manager component 128 for creating and decoding messages. In one illustrative embodiment, the message manager component 128 may correspond to a single software module. In another illustrative embodiment, the message manager components 128 may correspond to multiple software components, each performing a discrete function. For example, a message manager component may include a software module for creating messages, another software module for decoding messages and another software module for coordinating the communication of the messages between the servers. In yet another illustrative embodiment, the functions of the message manager component 128 may be performed in part, or entirely, by Web services 126. The Web services 126 may be part of the service provider 106 or be provided by a third party. The back end layer 112 includes one or more servers 120 including certain applications 130 and a message manager component 128 similar to server 118. Generally, the back end servers 120 are coupled with data stores 122 where data reside.

Figure 2A:
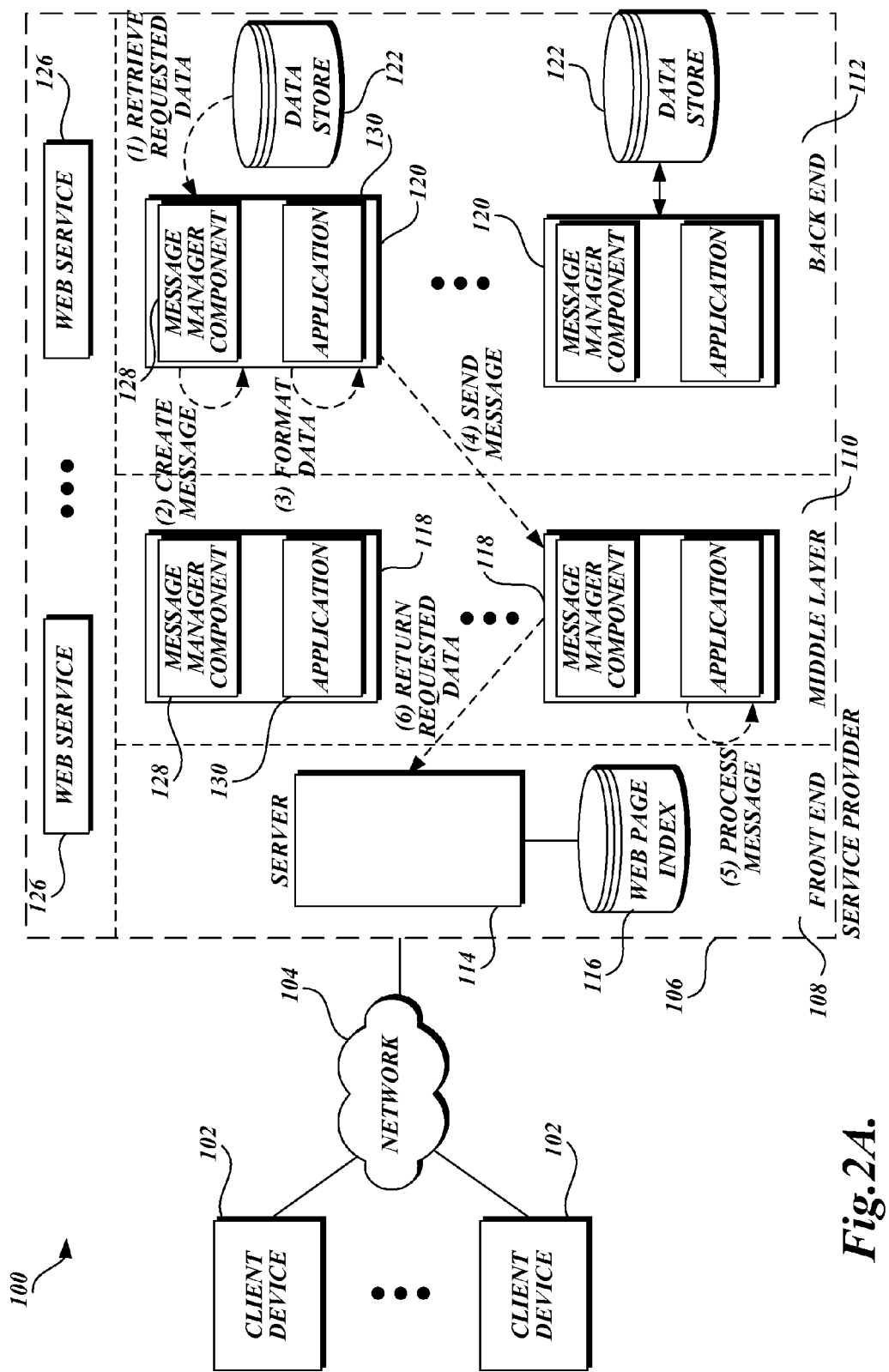
FIG. 2A is a block diagram of the operating environment of FIG. 1, illustrating data communication using a composite record format and binary encoding.
Figure 2B:
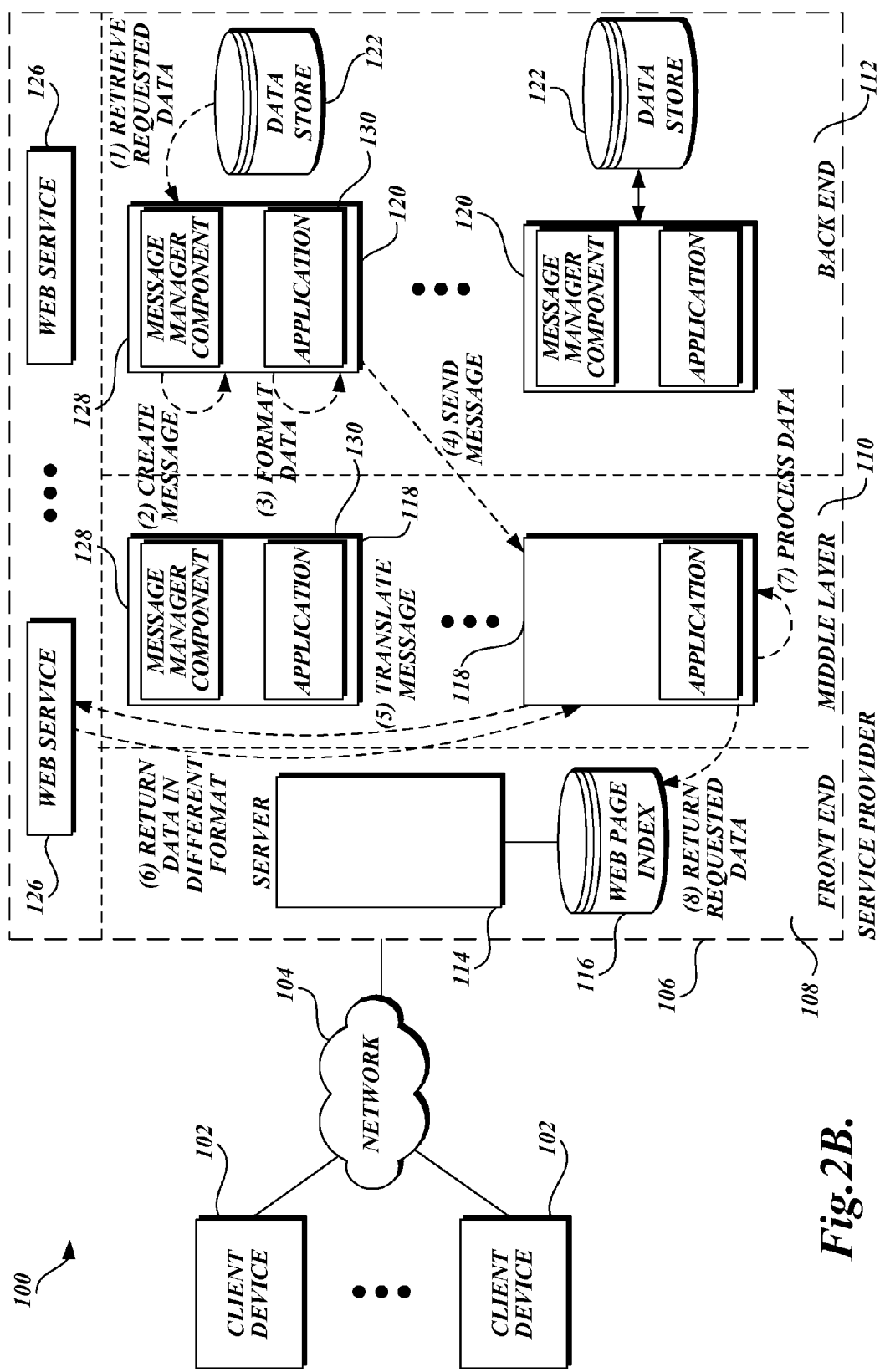
FIG. 2B is a block diagram of the operating environment of FIG. 1, illustrating data communication between servers and Web services using composite record format and binary encoding.

With reference now to FIGS. 2A and 2B, illustrative operation of the operating environment using a composite data format will be described. Referring to FIG. 2A, data is retrieved based on a request, for example, from a client device 102, by a back end server 120. The message manager component 128 of the back end server 120 encodes the data according to the binary encoding, includes the encoded data in a multi-record message with an appropriate data type for each record included in the multi-record message. The application 130 running on the back end server 120 may process the retrieved data from data store 122 in collaboration with the message manager component 128. When the server 120 has completed processing the data, the server 120 may forward the multi-record message to a server 118 in the middle layer 110 for further processing.

The message manager component 128 running on the middle layer server 118 receives the multi-record message and decodes the message based on the primitive data types and the binary encoding to retrieve the data for further processing. In a similar fashion to server 120, an application 130 running on the middle layer server 118 may further process the data thus extracted from the multi-record message. With continued reference to FIG. 2A, the middle layer server 118 may forward the multi-record message to the front end server 114 for yet further processing and/or returning results to a user of the client device 102 via the network 104. Those skilled in the art will appreciate that the applications 130 running on servers 118 and 120 may include many different types of applications depending on the system functions required. For example, an application 130 may be an order processing application that processes customer orders. Other applications 130 may include accounting applications, inventory management applications, etc. Depending upon the functions to be performed, the multi-record message passed between various servers mayor may not be transformed to different formats for use by different applications running on different servers. Therefore, it may be desirable to have the message manager component 128 running on as many servers 118 and 120 as operated by the service provider 106. Alternatively, the functions performed by the message manager 128 may be implemented by Web services 126, described more fully below.

With reference to FIG. 2B, the operation of the system may be implemented in a manner to incorporate the use of network-based components to process the multi-record message. In this illustrative embodiment, the retrieved data is encoded and included in a multi-record message, as described above with respect to FIG. 2A, in some of the servers 118 and 120. Other servers 118 and 120 may not include the message manager component 128 for various reasons. For example, a server 118 or 120 may be an old server running legacy applications which cannot interface with a message manager component 128. Similarly, a server may be an interface to a different type of system not under the control of the service provider 106, necessitating conversion of data format from the format of the multi-record message to another format. In some circumstances, it may be desirable to offload some of the processing performed by servers 118 and 120 to increase system throughput, even if servers 118 and 120 are capable of performing the processing. In these circumstances, or for central management of server resources, the functions of the message manager component 128 may be performed by one or more Web services 126 and used by multiple servers 118 and 120. In this illustrative embodiment, server 118 or 120 calls a function in the Web service 126 to perform the functions of the message manager component 128, for example, to encode and format the data accordingly and return the multi-record message to the server 118 or 120 using the Web service 126. The Web service 126 may both encode and decode the multi-record message for a server 118 or 120 that calls the Web service 126.

Figure 3:
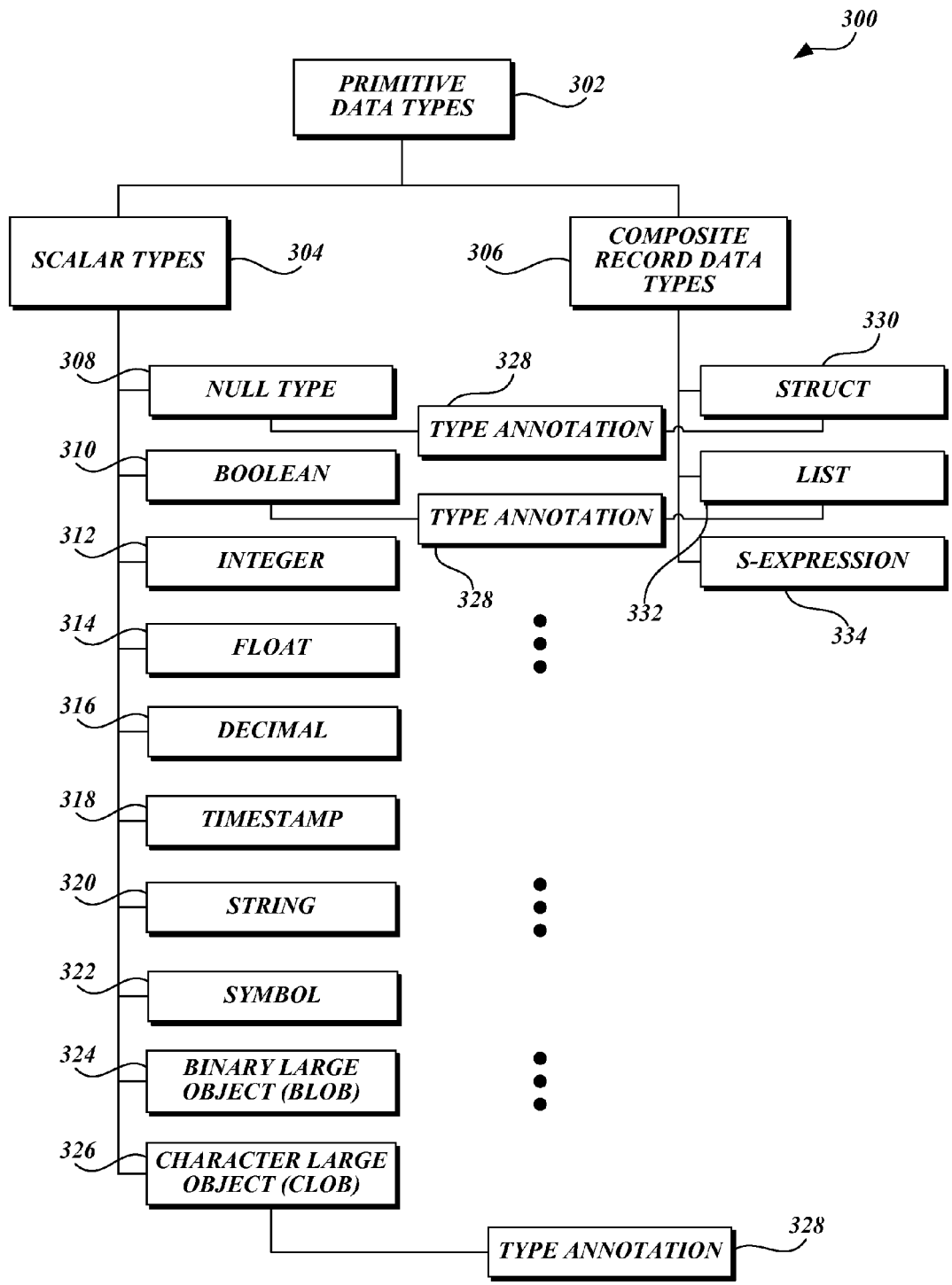
FIG. 3 is a block diagram of data types used in the composite record format in the operating environment of FIGS. 2A and 2B.

As noted above, the multi-record message includes records that hold data corresponding to one of several primitive data types. FIG. 3 is a block diagram showing the primitive data types briefly discussed above. With reference to FIG. 3, the primitive data types 302 can include two major subtypes, namely, scalar data types 304 and composite record data types 306. The scalar data types 304 include several scalar data types with defined types of data. In an illustrative embodiment, the scalar data types 304 include a Boolean data type 310, an integer data type 312, a float data type 314, a decimal data type 316, a time stamp data type 318, a string data type 320, a symbol data type 322, a binary large object 324, a character large object 326, and a null type 308. The null type 308 is a special data type used to define null value for all other scalar data types. A value of NULL signifies a value for the type of data that is indefinite and/or unusable. For example, a Boolean type 310 data may include two valid values, TRUE and FALSE. The Boolean data may also include a null type as a value which is an indefinite value, meaning the data is neither TRUE nor FALSE, indicating an indefinite or unassigned value for the data. Generally described, NULL values have a known indefinite value or unassigned value. For example, software applications may examine the value of a data variable and determine whether a valid value has been assigned to the variable or not. In addition to the null type 308 which may be associated with each data type, an annotation data type 328 may also be used to annotate each one of the scalar data types 304 and the composite record data types 306. The annotation data type 328 may be used to define the semantics of data types communicated between different applications by sending and receiving multi-record messages. For example, a data item having annotation data type 328 may be applied to an integer data item to indicate the specific type of the integer data item, such as "int32," indicating a 32-bit integer data item.

With continued reference to FIG. 3, composite record data types 306 include structure (or struct) data type 330, list data type 332, and S-expression data type 334. These data types may include other data types as records. For example, the structure data type 330 may include several fields, such as Boolean, integer, and string. Similarly, the list data type 332 may include a sequence of values, each having a different data type. S-expression data type 334 can be used for including executable code, such as scripts, in a multi-record message. For example, when a receiving application running on a server receives a multi-record message which includes an S-expression data type 334, the receiving application knows that the data contained within the S-expression data type 334 is executable code and takes appropriate action to execute or otherwise process the executable code represented by the S-expression data type 334. S-expression data type 334 may also be used to represent data other than executable code. The semantics of the data included in an S-expression are application-dependent and such data are interpreted at a higher level according to application-defined semantics. The primitive data types discussed above are generally included in the value field 408 of a multi-record message 400 discussed in more detail below.

Figure 4A:
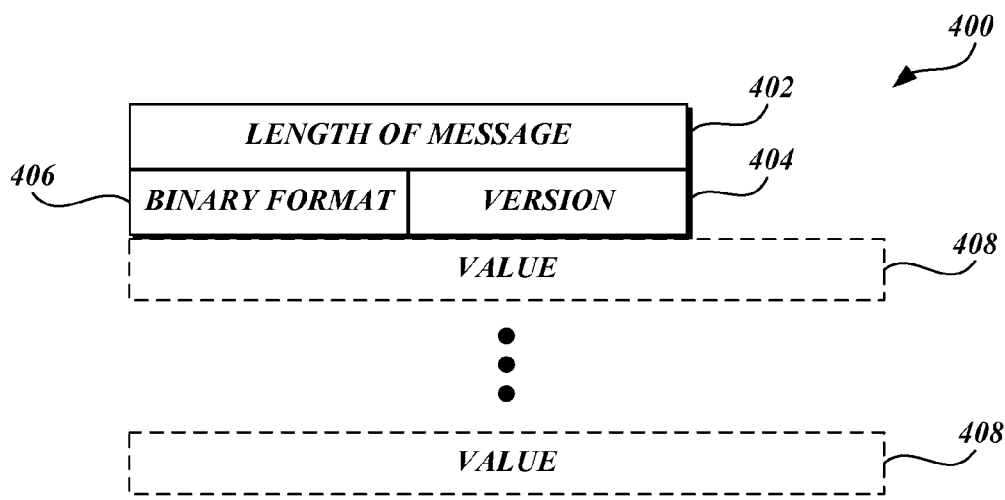
FIG. 4A is a block diagram of a message used to contain data having data types of FIG. 3.

FIG. 4A is a block diagram showing a multi-record message 400. The multi-record message 400 includes an optional length of message field 402, a binary format field 406, a version field 404 and one or more value fields 408. In one illustrative embodiment, the length of message field 402 indicates the total length of the entire multi-record message 400, including all fields in bytes. In another illustrative embodiment, the length of message field 402 may include the length of the field in other units, such as number of bits or number of words. Those skilled in the art will appreciate that many units may be used to represent length of digital data such as bits, bytes, 16-bit words, 32-bit words, etc. The message fields 402, 404 and 406 comprise a header of the message 400, while the value fields 408 represent a payload of the message 400. The actual data is included in subfields of the value field 408 as further discussed below.

Figure 4B:
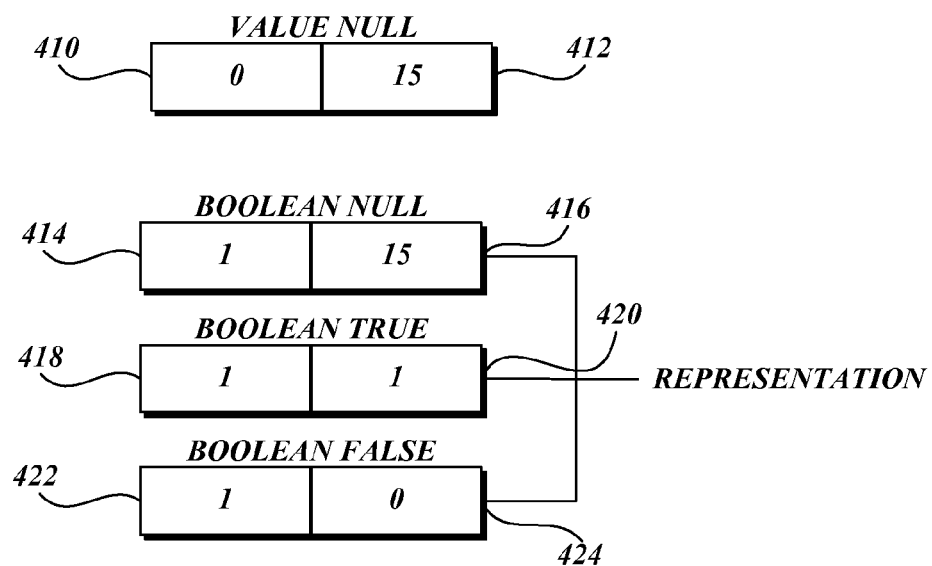
FIG. 4B is a block diagram representative of a general encoding format showing the encoding of null values for Boolean data type in accordance with an aspect of the present invention.
Figure 4C:
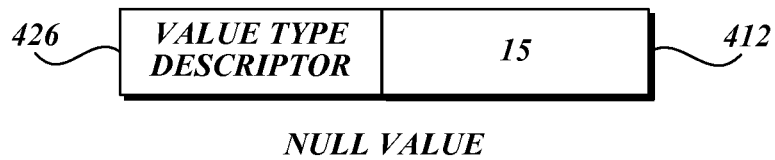
FIG. 4C is a block diagram representative of a general encoding format showing the general encoding format of a null value in accordance with an aspect of the present invention.

FIGS. 4B and 4C are block diagrams of binary encoding of NULL data types. With reference to FIG. 4C, a value type descriptor subfield 426 and a length descriptor subfield 412 are used to indicate whether a value is a NULL value or has other content. In one illustrative embodiment, the length descriptor sub field 412 may include a value of 15, expressed as four ones in binary format, indicating that the value field 408 includes a NULL value. Those skilled in the art will appreciate that any other fixed value may be used to indicate a NULL value or other data types described herein. The fixed numbers used herein are purely for illustrative purposes and ease of reference and are not meant to limit these disclosures in any manner. For example, with reference to FIG. 4B, a value field 408 having a type descriptor subfield 410 with a value of 0 and length descriptor subfield 412 with a value of 15 indicates a general NULL value. Similarly, a value field 408 having a type descriptor subfield 414 with a value of 1 and the length descriptor subfield 416 having a value of 15 indicates a Boolean data item with a value of NULL. In contrast, a value 408 having a type descriptor sub field 418 with a value of 1 and a length descriptor sub field 420 having a value of 1 indicates a Boolean data item having a value of TRUE, as indicated by the value of 1 in the sub field 420. Similarly, a value field 408 having a subfield 422 with a value of 1 and a subfield 424 with a value of 0 indicates a Boolean data item with a value of FALSE, as indicated by the value of 0 in the sub field 424. In this binary encoding of Boolean variables, as well as other types of binary-encoded data items, the multiple use of subfields, based on the content of the subfields, results in highly efficient and compact binary encoding formats. For example, with reference to FIGS. 4C and 4D, the length subfield 412 may indicate a data value or a data length, depending on the value the length subfield 412 contains. In other words, the subfield 412 indicates a null value for the data type indicated by subfield 426 if the value included in the length subfield 412 is 15. The same length sub field 412 indicates a length of the value of the data type indicated by subfield 426, if the value included in the length subfield 412 is in the range of 0-13. This multiple use of the same sub field 412 reduces the need for additional fields to represent various combinations. Further examples of this compact binary encoding are discussed below.

Figure 4D:
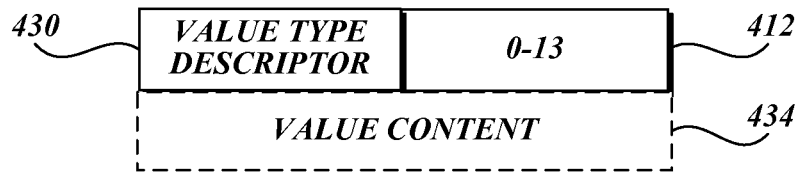
FIG. 4D is a block diagram representative of a general encoding format showing the encoding of a short value in accordance with an aspect of the present invention.

FIG. 4D is a block diagram showing the binary encoding of a short value requiring one or a few bytes to represent the short value. In one illustrative embodiment, the value 408 is used to represent a short value by having a value type descriptor subfield 430, a length descriptor subfield 412, having a value a predefined range, such as 0 through 13, and a value content subfield 434 including the actual value of the short data item. As noted above, those skilled in the art will recognize and appreciate that the contents of the length descriptor subfield 412 may be defined using numerical values other than those discussed herein without departing from the spirit of the disclosure. In an illustrative embodiment, the length descriptor subfield 412 having a value in the predefined range indicates the length of the value content 434 in the value field 408. For example, if the value included in the length descriptor subfield 412 is 8, the number of value content 434 subfield is understood to be 8 bytes. In other illustrative embodiments, the number of value content subfields 434 included in the value field 408 as indicated by the value of the length descriptor sub field 412 may be measured in other units, such as 16-bit words.

Figure 4E:
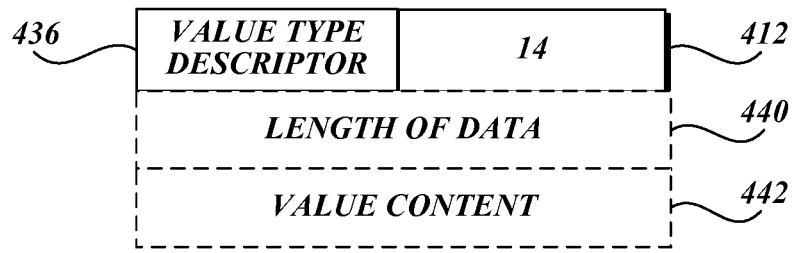
FIG. 4E is a block diagram representative of a general encoding format showing the encoding of a long value in accordance with an aspect of the present invention.

FIG. 4E is a block diagram showing the binary encoding of a value field representing a long data item. In one illustrative embodiment, the value type descriptor subfield 436 indicates the type of data item being represented, a length descriptor subfield 412 having a value outside the predefined range, such as 14, indicates that there are more value content sub fields 442 than can be represented by a number in the length descriptor sub field 412. For example, if the type descriptor subfield 436 indicates a character large object data type with hundreds of bytes, the length descriptor subfield 412 does not have sufficient capacity to include the length of the character large object data item. In this case, a length of data subfield 440 is included in the value field 408 in addition to the value content subfields 442, indicating the number of value content subfields 442 that follow.

Figure 5:
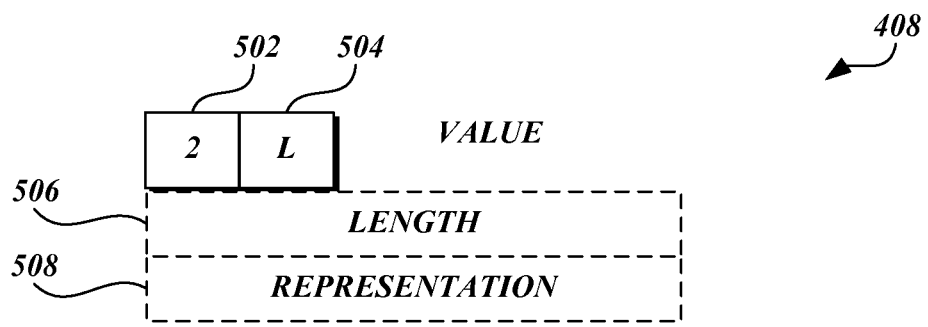
FIG. 5 is a block diagram representative of a general encoding format showing the encoding of a positive integer in accordance with an aspect of the present invention.

FIG. 5 is a block diagram showing the binary encoding of various data types as included in the value field 408. The general format of the value field 408 includes a type descriptor subfield 502, a length descriptor subfield 504, a length subfield 506 and a representation sub field 508. The type descriptor subfield 502 represents different scalar types or composite record data types, depending on the value included therein. For example, in one illustrative embodiment, a value of 2 included in the type descriptor subfield 502 indicates a positive integer, a value of 3 indicates a negative integer, a value of 4 indicates a float data type and a value of 5 indicates a decimal data type. The length descriptor subfield 504 indicates different formats, depending on the value contained therein. For example, in one illustrative embodiment, a value of 0 through 13 indicates a length of the representation sub field 508 in terms of number of bytes. A value of 14 in the length descriptor sub field 504 indicates that the length of the representation field 508 is too large to be included as a number in the length descriptor subfield 504 and that an extra length field 506 is included in the value field 408 to represent the length of the representation sub field 508 in terms of number of bytes. As noted above, a value of 15 in the type descriptor sub field 504 indicates a NULL value for the data type specified by the value included in the type descriptor subfield 502. For example, a value of 15 in the length descriptor subfield 504 and a value of 2 in the type descriptor sub field 502 indicates a positive integer with a NULL value. The type descriptor sub field 502 may indicate other data types according to the value contained therein, as noted above. For example, a value of 6 included in the type descriptor subfield 502 may indicate a timestamp data type, a value of 7 may indicate the symbol data type, a value of 8 may indicate a string data type, a value of 9 may indicate the text or character large object data type, and a value of 10 may indicate the binary or binary large object data type. As noted above, the numerical values used herein are for illustrative purposes only, and those skilled in the art will appreciate that other numerical values may be used without departing from the spirit of the disclosures. Each of these data types is further described below and their respective representations are discussed.

Figure 6:
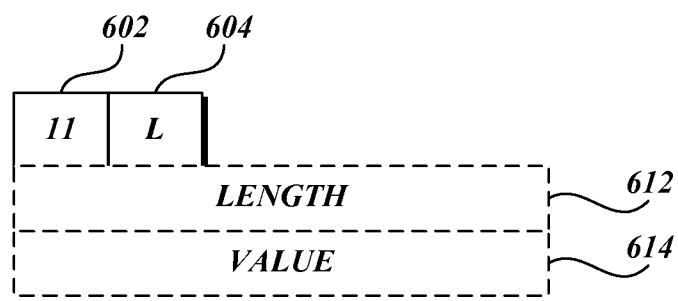
FIG. 6 is a block diagram representative of a general encoding format showing the encoding of a list data type in accordance with an aspect of the present invention.

FIG. 6 is a block diagram showing the binary encoding of a list data type. When a type descriptor subfield 602 indicates a list composite record data type 332, the length descriptor subfield 604 may contain a range of values, for example, 0-15. In this illustrative embodiment, a value of zero in the length descriptor sub field 604 indicates an empty list. A value of 15 indicates a null value for the list data type, and that no length field 612 or value fields 614 follow. The list data type 332 may further include a length field 612 and a value field 614. For length descriptor subfield 604 values other than zero and 15, the length field 612 indicates the number of bytes in the value field 614 to follow. The value field 614 of the list composite record data type 332, as indicated by the type descriptor in subfield 602, is a sequence of values. That is, each value field 614 is a value field 408 representing other data types as discussed herein. For example, a list composite record data type 332 may include a number of integers, decimal numbers, Boolean data items, etc., each value field thus included in the list data type having its own corresponding representation. The receiving software application processing the multi-record message can treat the extracted data accordingly.

S-expression data type 334 is a variation of the list data type 332. In one illustrative embodiment, a value of 14 in the type descriptor field 602 indicates an S-expression data type. An S-expression is generally used to contain executable code, such as scripts like Perl and JavaScript. Once a receiving software application receives a multi-record message including an S-expression type data item, the receiving software application treats the data item as an executable script and takes appropriate action, such as loading and executing the script.

Figure 7:
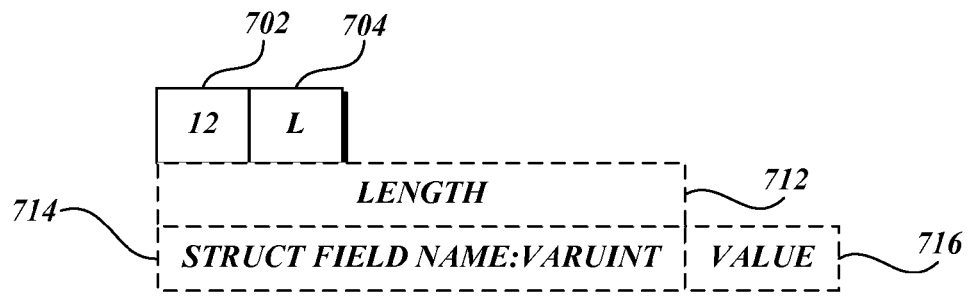
FIG. 7 is a block diagram representative of a general encoding format showing the encoding of a structure data type in accordance with an aspect of the present invention.

FIG. 7 is a block diagram showing the binary encoding of a structure composite record data type 330. In one illustrative embodiment, a value of 12 in the type descriptor subfield 702 indicates a structure composite record data type 330. As in the list composite record data type discussed above, the length descriptor subfield 704 may contain a range of values, for example, 0-15. In this illustrative embodiment, a value of zero in the length descriptor subfield 704 indicates an empty structure. A value of 15 indicates a null value for the structure data type 330, and that no length field 712, structure name field 714, or value field 716 follow. A value of one (1) in the length descriptor sub field 704 indicates that at least one structure name field 714 and a corresponding value field 716, forming a structure name-value pair, follow the length field 712. Additionally, the value of one in the length descriptor sub field 704 indicates that multiple structure name fields 714, if any, are sorted in increasing numerical order. Otherwise, for other values included in the length descriptor subfield 704, the order of the multiple structure name fields 714 is undetermined. As a composite record data type, the structure data type 330 may include other data types in the value field 716, each data type represented by its own appropriate value field as described with respect to FIG. 5. In one illustrative embodiment, the structure name field 714 may include an integer or a symbol followed by the value field 716. The value field 716 is the same as the value field 408 discussed with respect to FIG. 5.

Transmission of data, such as data included in a structure composite record data type, may be performed more efficiently by use of symbol tables. Symbols are identifiers that may be associated with a value. Symbol tables associate each symbol with an arbitrary numerical value, different from the value that may be represented by the symbol. In later processing, the value associated with the symbol in the symbol table may be used to identify the symbol and the value the symbol may represent. For example, in the structure composite record data type, the data pair comprising the structure name field 714 and the corresponding value field 716 may use symbol table values associated with the symbol name that is used for structure name field 714 for more efficient data processing. For instance, to compare and see if one field of a structure composite record data type is equal to another field, the symbol table number corresponding to the symbol used for the structure name field 714 may be used in the comparison instead of a string representing the symbol. Those skilled in the art will appreciate that a numerical comparison is computationally far more efficient that comparison of strings, and with reference to FIGS. 2A and 2B, make the process of decoding a multi-record message communicated between two servers 118 and 120 more efficient. A symbol table may be used as follows. In one illustrative embodiment, the symbol table may be transmitted from a server 120 to a server 118 for use in decoding a message transmitted later. The symbol table itself may be encoded in binary format as a structure composite record data type. Once the symbol table has been transmitted from the server 120 to the server 118, subsequently, many multi-record messages may be transmitted without retransmitting the information included in the symbol table. For example, a particular telephone directory is transmitted from server 120 to server 118, wherein each record in the directory includes a first name, a last name, several address fields, and a telephone number, each of the foregoing being a field in each of the records of the telephone directory. A symbol table may first be constructed using the aforementioned telephone directory fields and transmitted from the server 120 to server 118. Subsequently, many hundreds or thousands of similar telephone records may be transmitted from server 120 to server 118 without repeating the symbol information in each record. Field names, instead, are identified by the use of the numbers assigned to symbols in the symbol table, making the process of transmitting records much more efficient.

Figure 8A:
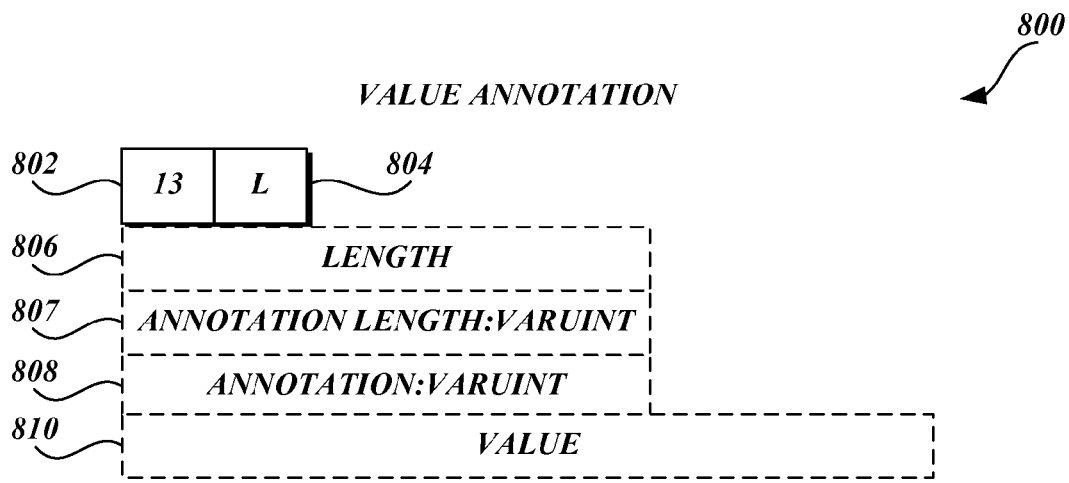
FIG. 8A is a block diagram representative of a general encoding format showing the encoding of an annotation data type for integers in accordance with an aspect of the present invention.

In addition to use of symbol names to provide some context information, annotation on data types may be used to annotate each of the data types discussed herein. FIG. 8A is a block diagram showing the binary encoding of an annotation data type used to annotate integers. A type descriptor data sub field 802 having a value of 13 indicates an annotation data type (or "annotation wrapper"). A length descriptor subfield 804 includes values with the same meanings as those described with respect to FIGS. 4B-5. With regard to the annotation wrapper 800, the length descriptor subfield 804 indicates the length from the beginning of the annotation length field 807 to the end of the value field 810 enclosed by the annotation wrapper 800. A length field 806 is included only if the value of a length descriptor subfield 804 is equal to 14, indicating that the length of value sub field 810 in bytes is larger than would fit in the length descriptor subfield 804. The annotation length field 807 indicates the length of the annotation list field 808. The annotation list field 808 includes the annotation information for the value subfield 810. An annotation data type is a list of symbol data types, generally used to provide semantic information about other types. For example, an annotation list for BLOB binary data may include symbols such as "this BLOB is a JPG," providing additional data type information.

Figure 8B:
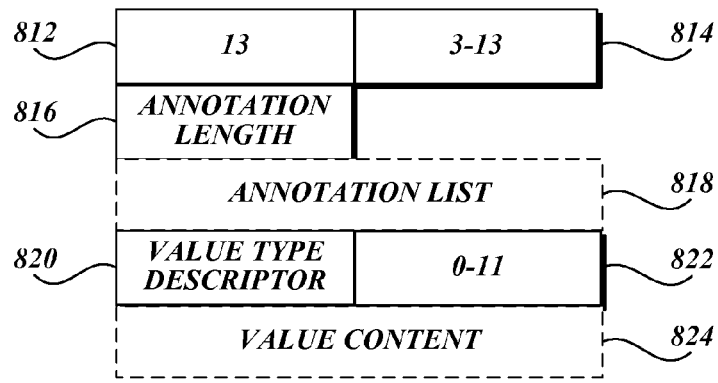
FIG. 8B is a block diagram representative of a general encoding format showing the encoding of an annotation data type with a short total length for annotating a short data type in accordance with an aspect of the present invention.
Figure 8C:
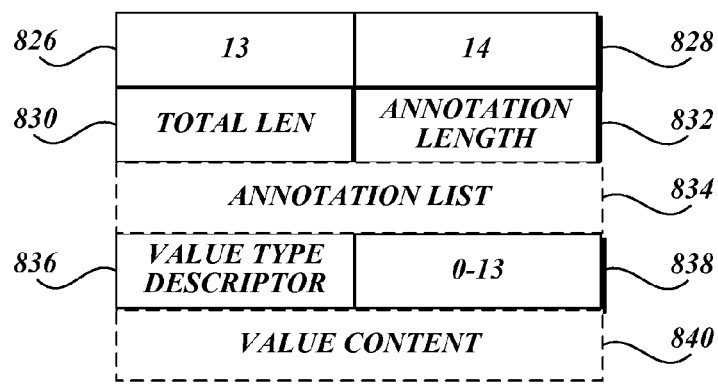
FIG. 8C is a block diagram representative of a general encoding format showing the encoding of an annotation data type with a long total length for annotating a short data type in accordance with an aspect of the present invention.
Figure 8D:
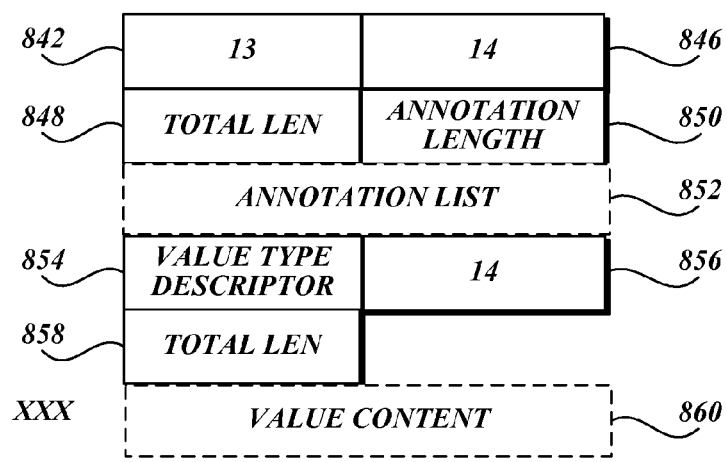
FIG. 8D is a block diagram representative of a general encoding format showing an annotation data type with a long total length for annotating a long data type in accordance with an aspect of the present invention.

FIGS. 8B-8D are block diagrams showing different binary encodings for different lengths of annotation and different lengths of data item fields. Type descriptor subfields 812, 826 and 842 indicate that the binary encoding is for an annotation data type. The length descriptor sub field 814 having a value of 3 through 13 indicates that the total length of the value field 408 is indicated by the value contained in the length descriptor subfield 814. Annotation length subfield 816 indicates the number of bytes in an annotation list 818. The annotation list 818 is followed by a value type descriptor 820 indicating the type of data item being annotated. The length descriptor sub field 822 includes values with the same meanings as those described with respect to FIGS. 4B-5 and indicates the length of value content 824 in bytes as the number contained in the length descriptor subfield 822.

With reference to FIG. 8C, the length descriptor subfield 828 contains a value of 14 indicating, as noted above, that the total length of the value field 408 being represented is greater than can be represented in the length descriptor subfield 828. The total length sub field 830 indicates the total length of the value field 408 being represented. The annotation length sub field 832 indicates the length of annotation list 834 in bytes. The value type descriptors 836 and 854 indicate the type of data item being annotated. The length descriptor subfield 838 generally includes values with the same meanings as those described with respect to FIGS. 4B-5, and in this case, contains a value between 0 and 13 signifying that the length of the value contents 840 is represented by the value contained in the length descriptor sub field 838.

With reference to FIG. 8D, fields 842, 846, 848, 850, 852, 854, and 860 all have the same meanings as described above with respect to FIG. 8C. Length descriptor subfield 856 generally includes values with the same meanings as those described with respect to FIGS. 4B-5, and in this case, contains a value of 14 indicating that the length of value content 860 is larger than can be represented by a number in the type descriptor subfield 856. Accordingly, a total length subfield 858 is included in the value field 408 to represent the length of value content 860 in bytes.

Figure 9A:
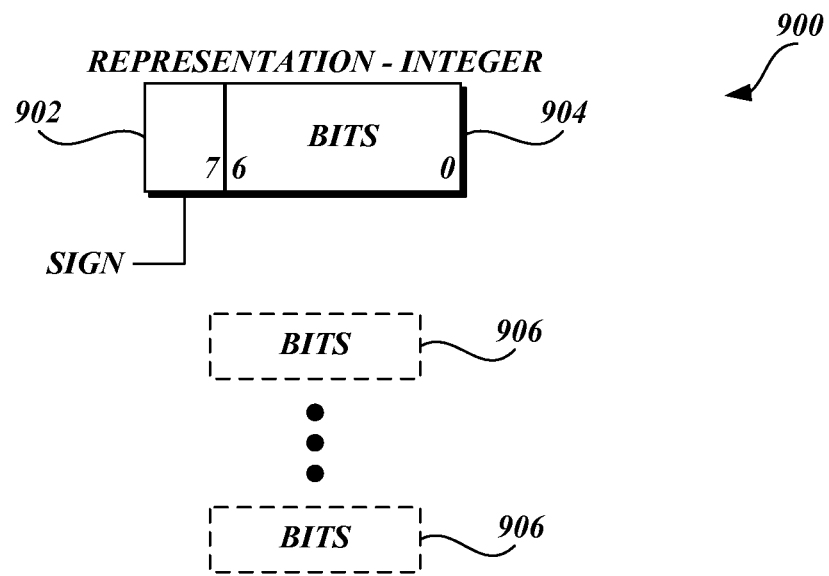
FIG. 9A is a block diagram representative of a general encoding format showing the encoding of a signed integer in accordance with an aspect of the present invention.
Figure 9B:
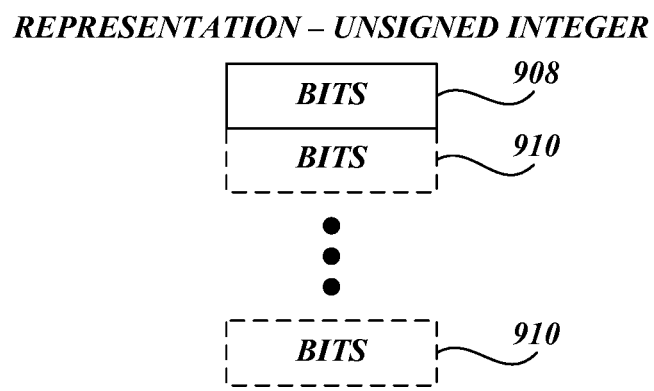
FIG. 9B is a block diagram representative of a general encoding format showing the encoding of an unsigned integer in accordance with an aspect of the present invention.

Some of the scalar data types discussed above, such as integer and decimal data types, require further specification of the respective representations beyond the assigned value in the type descriptor sub field 502 of value field 408. The data item included in the representation subfield 508 is further encoded according to the binary formats discussed below. FIG. 9A is a block diagram showing the binary encoding of a signed integer 900. In this representation, the sign bit 902 is the most significant bit in the representation. Those skilled in the art will appreciate that, even though the representation of an integer 900 is shown as multiple octets, in other embodiments, words having more than 8 bits may be used. Other bits 904 are used to represent the actual value of the integer data type. For longer integers, additional bits 906 with no sign bits are used. FIG. 9B is a block diagram showing the binary encoding of an unsigned integer. The unsigned integer is similar to the signed integer representation discussed with respect to FIG. 9A, except that no signed bit is used. An unsigned integer is simply represented as a sequence of bytes 908 and 910. The total number of bytes of signed and unsigned integers is indicated by the length sub field 506 of the value field 408.

Figure 10:
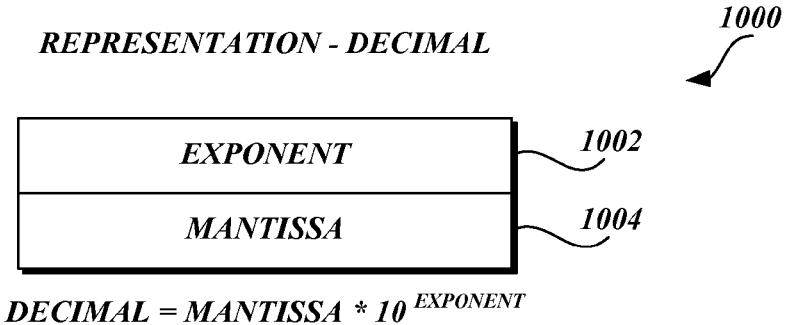
FIG. 10 is a block diagram representative of a general encoding format showing the encoding of a decimal number in accordance with an aspect of the present invention.

FIG. 10 is a block diagram showing the binary encoding of a decimal number 1000. A decimal number 1000 is represented as a mantissa 1004 and an exponent 1002. The value of a decimal number is equal to the value of the mantissa 1004 multiplied by 10 raised to the power of the value of the exponent 1002.

Figure 11:
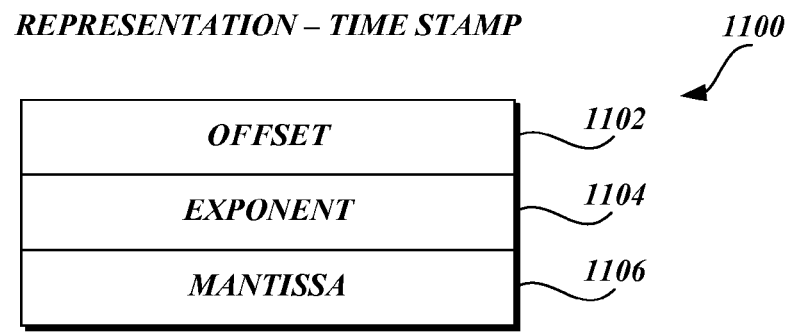
FIG. 11 is a block diagram representative of a general encoding format showing the encoding of a time stamp data type in accordance with an aspect of the present invention.

FIG. 11 is a block diagram showing the binary encoding of a time stamp data type 1100. The representation of a time stamp data type includes a mantissa subfield 1106, an exponent subfield 1104 and an offset subfield 1102. A time stamp's value is equal to the value of mantissa 1106 multiplied by 10 to the power of the value of exponent 1104, the quantity added to 60 multiplied by the offset 1102. A data value having the time stamp data type 1100 may represent time in units of seconds, milliseconds, or any other unit of time.

Figure 12:
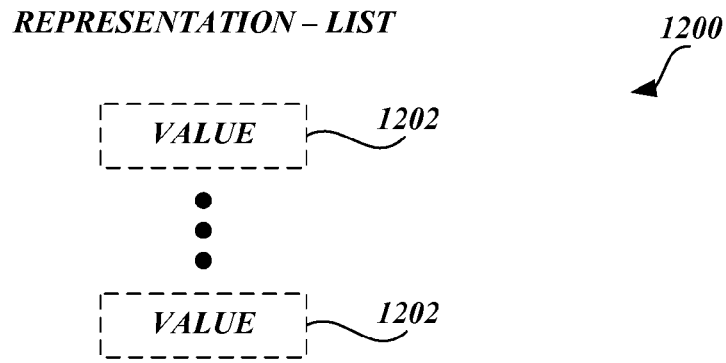
FIG. 12 is a block diagram representative of a general encoding format showing the encoding of a list data type in accordance with an aspect of the present invention.

FIG. 12 is a block diagram showing the binary encoding of a list data type 1200. As noted above with respect to FIG. 6, the representation sub field 614 includes a list of values 1202, the number of which is indicated by the value in the length subfield 612. Also as noted above, the value subfield 1202 included in the list 1200 is the same as the value 408 with the same binary format shown in FIG. 5.

Figure 13A:
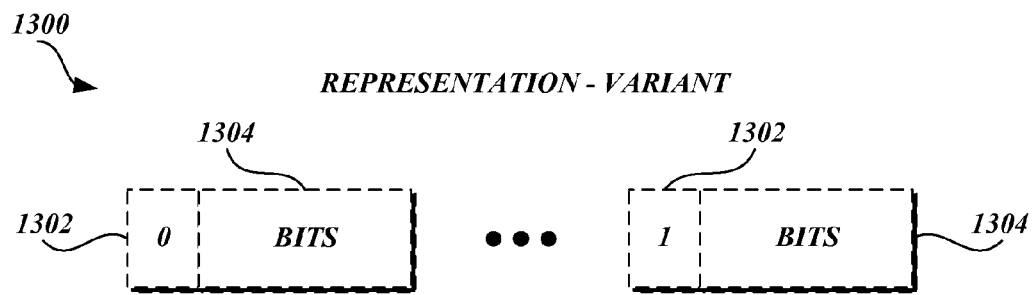
FIG. 13A is a block diagram representative of a general encoding format showing the encoding of a variable length, unsigned integer in accordance with an aspect of the present invention.
Figure 13B:
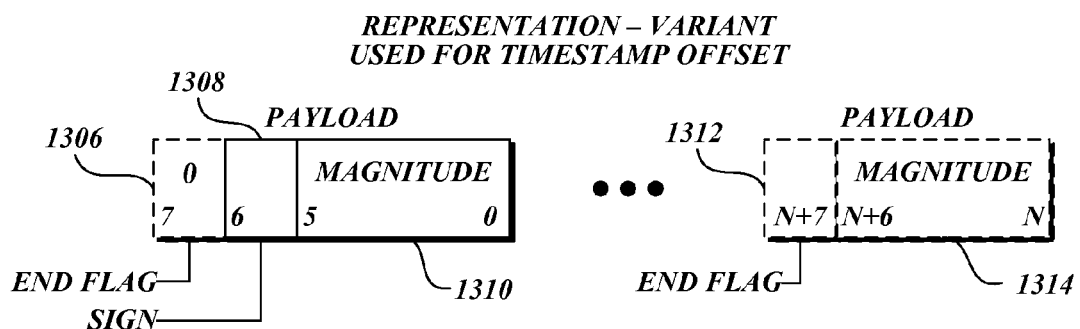
FIG. 13B is a block diagram representative of a general encoding format showing the encoding of a variable length, signed integer in accordance with an aspect of the present invention.

In addition to using the length sub field 506 of the value field 408 to specify the length of data in a multi-record message, self-delimiting representations of data may also be used. For example, FIGS. 13A and 13B are block diagrams showing self-delimiting representations 1300 and 1350 of unsigned integers and signed integers, respectively. With respect to FIG. 13A, the first octet 1304 has the highest order bit 1302 set to 0, indicating that the octet 1304 is not the last byte in the sequence of bytes 1300. Subsequent bytes 1304 in the sequence also have their highest order bits 1302 set to 0. Only the last octet (or byte) has the most significant bits set to 1 to indicate that this octet is the last byte in the sequence. In this manner, a long integer comprising multiple bytes may be represented with a self-delimiting format. Similarly, FIG. 13B shows a signed integer with multiple bytes. The first byte 1310 in the sequence includes an end flag 1306 set to 0, a signed flag 1308 set appropriately to indicate a positive or negative integer, and a magnitude indicating the value of the integer being represented. In subsequent bytes, the end flag is set to 0 to indicate that this byte is not the last byte in the sequence. Only the first byte in the sequence has a signed flag 1308. Other bytes in the sequence, including the last byte, do not have a signed byte. The last byte in the sequence includes an end flag 1312 set to 1 to indicate that this is the last byte in the sequence. The remaining bits indicate the magnitude of the integer being represented.

Figure 14:
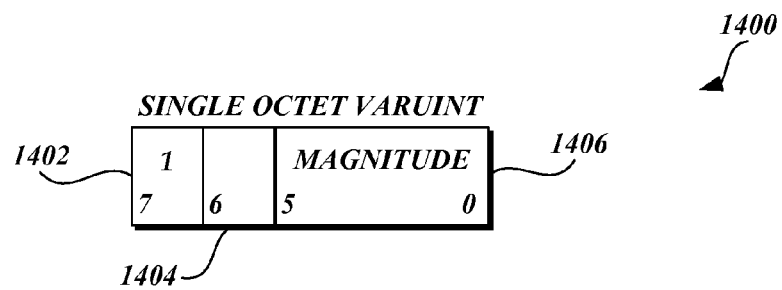
FIG. 14 is a block diagram representative of a general encoding format showing the encoding of a single octet integer in accordance with an aspect of the present invention.

FIG. 14 is a block diagram showing a single octet signed integer 1400. This is similar in format to the self-delimiting representation of a signed integer discussed in FIG. 13, except that the first and only byte is also the last byte, and therefore, the end flag 1402 is set to 1 to indicate that this is the first, the only and the last byte in the sequence. A single octet signed integer has a signed bit 1404 to indicate the sign of the integer being represented and a magnitude 1406 to indicate the value of the integer.

Although various data structures and values have been described and illustrated with regard to FIGS. 4-14, one skilled in the relevant arts will appreciate that alternative structures and values are considered to be within the scope of the present invention.

Figure 15:
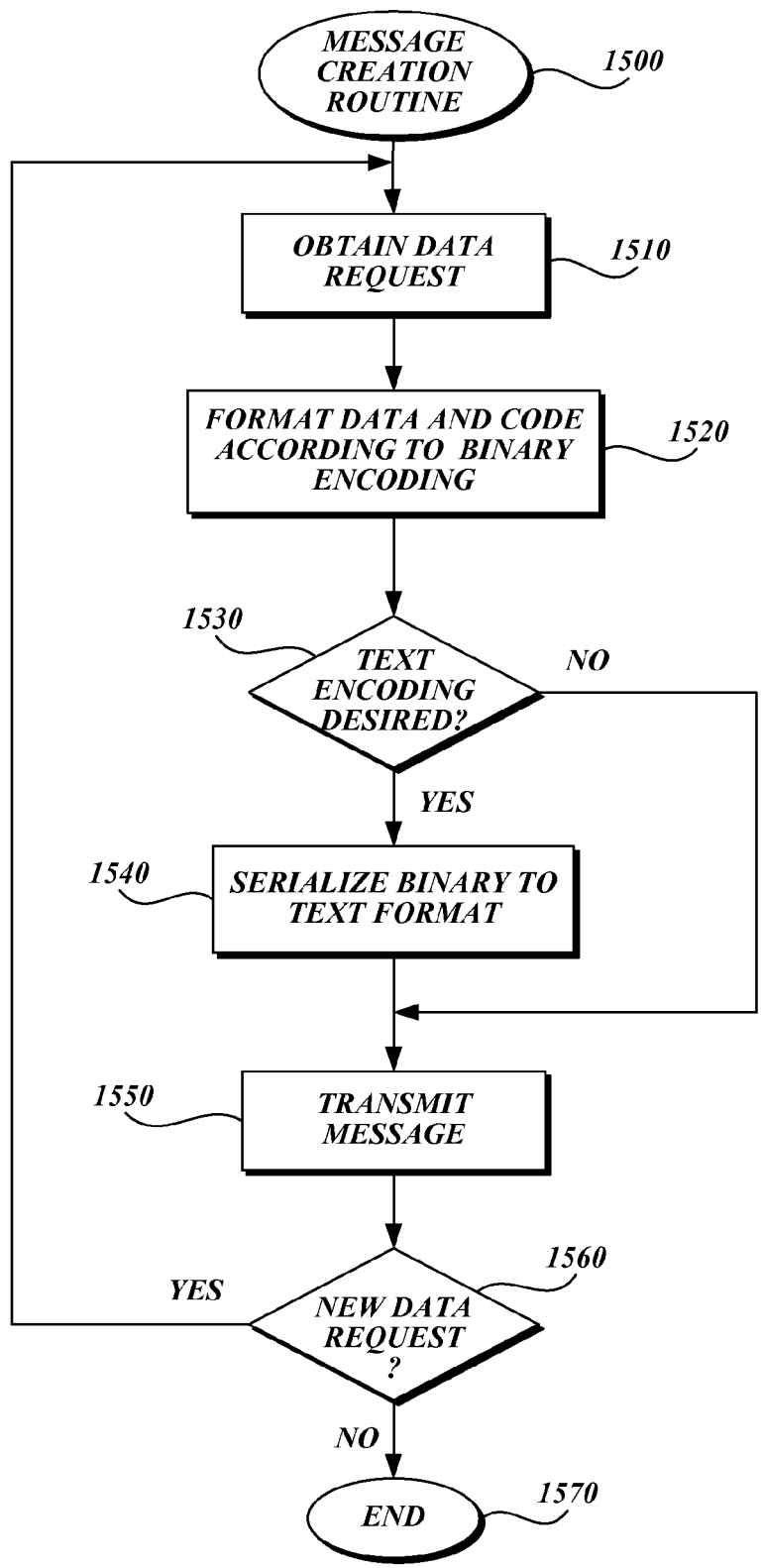
FIG. 15 is a flow diagram depicting an illustrative method for creating a composite record message.

As briefly noted above, once data is represented according to the appropriate data types shown in FIG. 3, the data is loaded into a multi-record message for transmission between servers 118 and 120, as shown in FIGS. 1-2B. FIG. 15 is a flow diagram showing an illustrative method 1500 of creating a multi-record message. With reference to FIGS. 2A and 2B, the routine starts at block 1500 and proceeds to block 1510, where a data request is obtained. A data request may be initiated by a client device 102 through a network 104 and propagate through the front end layer 108, the middle layer 110, and a back end layer 112. Alternatively, the data request may be originated in anyone of the applications 130 running on any of the servers. Next, the requested data is obtained from a data store 122, typically by a back end server 120. The message manager component 128 running on the back end server 120 includes the retrieved data according to the appropriate binary representation for each data type and formats the binary encoded data to be included in a multi-record message 400. At decision block 1530, the method 1500 determines whether text encoding of the data is desired. This determination may be made by the message manager component 128 or by other components running on the back end server 120 which are aware of processing logic and rules with respect to the encoding of data. Text encoding of the data includes the encoding of data in a text format according to a grammar which creates a text encoding of the binary-encoded data with a one-to-one correspondence between the text-encoded data types and the binary-encoded data types. For example, a structure data type having three fields including a Boolean field, an integer field, and a decimal field may be encoded in text having the same three fields identified correspondingly. Having semantically isomorphic notations in the binary encoding and the corresponding text encoding allows easy and direct conversion of data from the binary encoding to the text encoding and vice versa. The binary and text encodings are also optimized for efficiency and usability, respectively. Specifically, the binary encoding provides a highly compact and efficient encoding of data optimized with respect to data storage space requirements and transmission speed, while the text encoding is optimized for ease of use and readability for human users.

If no text encoding is required, the routine 1500 moves to block 1550 where the message is transmitted to the receiving server. If text conversion is required, the method moves to block 1540 where the binary data is converted to text format, as discussed above. In one illustrative embodiment, the message manager component 128 can handle both text-encoded data and binary-encoded data. In another illustrative embodiment, the message manager component 128 may include distinct software modules for handling binary-encoded data and text-encoded data. The method proceeds to decision block 1560 and ascertains whether a new data request is pending. If a new data request is pending, the method proceeds back to block 1510 to obtain the data request. If no more data requests are pending, the method proceeds to block 1570 and terminates. At the receiving server, the received message is processed by a similar message manager component 128.

Figure 16:
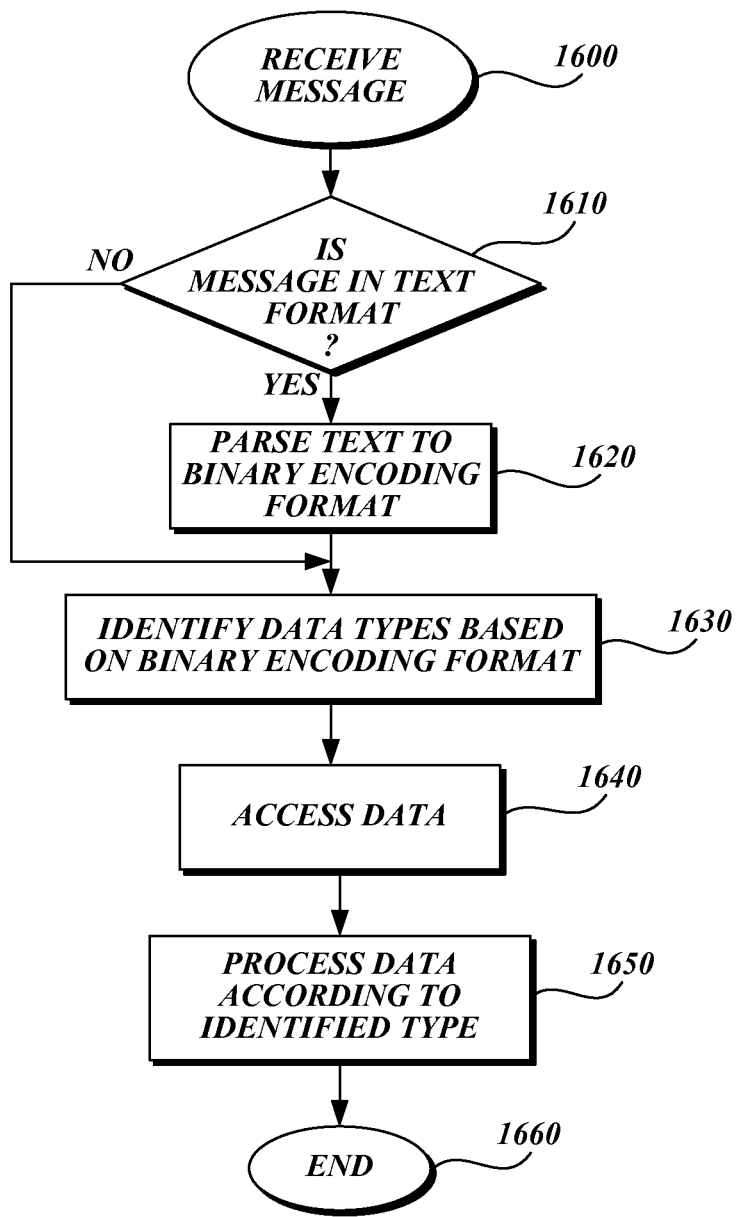
FIG. 16 is a flow diagram depicting an illustrative method of processing a composite record message.

FIG. 16 is a flow diagram of an illustrative method 1600 for receiving and processing a multi-record message. As described with respect to FIGS. 1-2B, the message manager component 128 creates, sends and receives multi-record messages 400. The application 130, in conjunction with the message manager component 128, interprets and processes such multi-record messages 400. In this context, the method 1700 proceeds to decision block 1610 and determines whether the message is in text format. If the message is in text format, the method proceeds to block 1620 where the text format is converted to binary-encoding format, as discussed above. The method then proceeds to block 1630 where the data types of data records included in the multi-record message are identified based on the binary-encoding format. Back at block 1610, if the message is determined to be in binary format, the method proceeds directly to block 1630 to extract the data from the multi-record message.

The method proceeds to block 1640 where data, having one of several predefined primitive data types described above, extracted from the multi-record message is accessed and used directly without further conversion of formats other than conversion to a native format usable by the receiving application. This is in contrast to a method using a single data type, such as XML. For example, if numerical data were transmitted in a message as strings instead of integers or decimals, such numerical data would have to be converted to numerical format first before processing the numerical data. For instance, two numbers included as strings cannot be arithmetically added unless and until the numbers are converted to numerical formats suitable for processing in the computer arithmetic and logic units (ALU). An encoding method with predefined primitive data types avoids this extra type/format conversion overhead. Such predetermined primitive data types provide additional advantages. For example, if the sending and the receiving servers are both aware of the binary encoding and the predetermined primitive data types, then only a single parser is required to parse the data. Those skilled in the art will appreciate that each format requires a different parser to parse data encoded in that format. Having fewer formats and less need for conversion between formats substantially reduces or eliminates the need for multiple parsers, thus reducing the complexity and cost of the overall system. Additionally, the binary data may be parsed only partially, in contrast to being parsed completely, before being processed. Partial parsing of a data set for use allows an application to parse only the portion of data set the application presently needs and avoid the unnecessary overhead of parsing the complete data set before using only a portion of the data set.

The method proceeds to block 1650, where the accessed data is processed in accordance with the identified predefined primitive data types, as discussed above. The method determines whether executable code is included in the message. The executable code may be in the form of a script, such as Perl or JavaScript, embedded in an S-expression data type. Once the message manager component 128 identifies a data record in the multi-record message as an S-expression, the message manager component 128 passes the data (i.e., executable code) embedded in the S-expression to the application 130, which treats the data accordingly. For example, the executable code thus obtained may be passed on to a script manager component to load and execute the extracted script. Alternatively, the extracted script may be passed on to another server via another multi-record message to be processed by an application on the other server. Those skilled in the art will appreciate that scripts are used to perform many data processing functions in business applications, such as conversion of formats, database queries, display formatting, etc. The method terminates at block 1660.

While illustrative embodiments have been illustrated and described, it will be appreciated that various changes can be made therein without departing from the spirit and scope of the invention.

What is claimed is:

1. A system comprising:
at least one computing device configured to implement one or more services, wherein the one or more services are configured to:
in response to receiving a request to encode digital data including a plurality of digital information items, binarily encode the digital data in accordance with a plurality of primitive data types to generate first binarily-encoded data;
return the first binarily-encoded data in a first multi-record message, wherein the first multi-record message includes a plurality of value fields and wherein individual value fields represent individual digital information items of the digital data;
in response to receiving a second multi-record message, identify primitive data types used to generate second binarily-encoded digital data included in one or more value fields of the second multi-record message;
decode the second binarily-encoded digital data based, at least in part, on the identified primitive data types to generate decoded data; and
return the decoded data.

2. The system of claim 1, wherein individual ones of the plurality of primitive data types are associated with a NULL value, wherein the NULL value is represented by a data type descriptor subfield and a length descriptor subfield.

3. The system of claim 1, wherein the plurality of primitive data types include at least one of scalar data types or composite data types.

4. The system of claim 3, wherein the scalar data types include at least one of a Boolean data type, an integer data type, a real data type, a decimal data type, a timestamp data type, a string data type, a symbol data type, a binary large object data type, or a character large object data type.

5. The system of claim 3, wherein the composite data types include at least one of a struct data type, a list data type, or an S-expression data type.

6. The system of claim 3, wherein individual ones of the plurality of primitive data types further comprise an annotation data wrapper configured to provide additional type information about at least one of a corresponding scalar data type or composite data type.

7. The system of claim 1, wherein the first or second multi-record message includes a length of message field for representing a length of the corresponding multi-record message.

8. The system of claim 1, wherein the first or second multi-record message includes a self-delimiting representation of individual value fields.

9. The system of claim 1, wherein the one or more services are further configured to decode at least a portion of the second binarily-encoded digital data included in one or more value fields of the second multi-record message without conversion to a non-binary format.

10. The system of claim 1, wherein the one or more services are further configured to cause processing of the decoded data without conversion of the decoded data.

11. A non-transitory computer readable storage medium storing computer executable instructions that when executed by a processor perform operations comprising:
binarily encoding individual digital information items of a plurality of digital information items in accordance with at least one primitive data type of a plurality of primitive data types to generate binarily-encoded digital information items; and
storing the binarily-encoded digital information items in a multi-record message, wherein the multi-record message comprises a binary format identification field for identifying the at least one primitive data type and further comprises a plurality of value fields, wherein individual value fields of the plurality of value fields represent the individual digital information items.

12. The non-transitory computer readable storage medium of claim 11, wherein individual ones of the plurality of value fields further comprise a value type descriptor field, a length of data field, and a representation field.

13. The non-transitory computer readable storage medium of claim 11, wherein binarily encoding individual digital information items comprises binarily encoding individual digital information items according to a plurality of binary data formats, individual binary data formats of the plurality of binary data formats corresponding to one of the plurality of primitive data types.

14. The non-transitory computer readable storage medium of claim 13, wherein at least one of the plurality of binary data formats includes at least one of a type descriptor subfield, a length descriptor subfield, or one or more value content fields.

15. The non-transitory computer readable storage medium of claim 14, wherein at least one of the plurality of binary data formats further includes at least one of an annotation data wrapper configured to provide additional type information about a corresponding primitive data type, a value type descriptor subfield, or a value length descriptor subfield.

16. The non-transitory computer readable storage medium of claim 11, wherein the operations further comprise transmitting the multi-record message to a receiving computing device.

17. The non-transitory computer readable storage medium of claim 16, wherein at least one of the binarily-encoded digital information items is decoded at the receiving computing device without conversion to a non-binary format.

18. A non-transitory computer readable storage medium storing computer executable instructions that when executed by a processor perform operations comprising:
decoding at least one binarily encoded digital information item of a plurality of binarily encoded digital information items based, at least in part, on a primitive data type associated with the at least one binarily encoded digital information item, wherein the plurality of binarily encoded digital information item is represented in a multi-record message comprising a binary format identification field for identifying at least the primitive data type and further comprising a plurality of value fields, wherein individual value fields of the plurality of value fields represent individual digital information items of the plurality of binarily encoded digital information items; and retrieving decoded digital information based, at least in part, on the decoding of the at least one binarily encoded digital information item.

19. The non-transitory computer readable storage medium of claim 18, wherein individual ones of the plurality of value fields have a value type descriptor field, a length of data field, and a representation field.

20. The non-transitory computer readable storage medium of claim 18, wherein the operations further comprise processing the decoded digital information without conversion of the decoded digital information.

21. The non-transitory computer readable storage medium of claim 18, wherein the operations further comprise extracting the at least one of the binarily encoded digital information items from the multi-record message prior to decoding the at least one binarily encoded digital information item.

22. The non-transitory computer readable storage medium of claim 21, wherein extracting the at least one of the binarily encoded digital information items comprises extracting the at least one binarily encoded digital information item without converting the at least one binarily encoded digital information item from a non-binary format.

23. The non-transitory computer readable storage medium of claim 21, wherein extracting the at least one of the binarily encoded digital information items does not require extracting remaining individual binarily encoded digital information items from the multi-record message.

24. The non-transitory computer readable storage medium of claim 18, wherein at least one of the binarily encoded value fields comprises a self-delimiting representation of a corresponding digital information item.

* * * * *

UNITED STATES PATENT AND TRADEMARK OFFICE
CERTIFICATE OF CORRECTION

| | |
|---|---|
| PATENT NO. | : 9,300,764 B2 |
| APPLICATION NO. | : 14/673639 |
| DATED | : March 29, 2016 |
| INVENTOR(S) | : Andrew J. Lusk |

It is certified that error appears in the above-identified patent and that said Letters Patent is hereby corrected as shown below:

Specification

In column 6 at line 11, Change "mayor" to --may or--.

In column 9 at line 29, Change "timestamp" to --time stamp--.

Signed and Sealed this
Second Day of August, 2016

Michelle K. Lee
*Director of the United States Patent and Trademark Office*